US009630628B2

(12) United States Patent
Holub

(10) Patent No.: US 9,630,628 B2
(45) Date of Patent: Apr. 25, 2017

(54) HAND-ON STEERING WHEEL DETECTION

(71) Applicant: Ford Global Technologies, LLC, Dearborn, MI (US)

(72) Inventor: Patrick Kevin Holub, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/713,025

(22) Filed: May 15, 2015

(65) Prior Publication Data

US 2016/0332635 A1    Nov. 17, 2016

(51) Int. Cl.
*B60W 40/08* (2012.01)
*B60W 50/08* (2012.01)

(52) U.S. Cl.
CPC ............ *B60W 40/08* (2013.01); *B60W 50/08* (2013.01)

(58) Field of Classification Search
CPC ....................................................... B62D 6/00
USPC ............................................................ 701/36
See application file for complete search history.

(56) References Cited

U.S. PATENT DOCUMENTS

| | | |
|---|---|---|
| 6,525,646 B1 | 2/2003 | Bartz |
| 6,982,656 B1 | 1/2006 | Coppinger et al. |
| 7,171,026 B2 | 1/2007 | Shinada |
| 8,036,715 B2 | 10/2011 | Buck |
| 8,738,292 B1 | 5/2014 | Faaborg et al. |
| 8,862,486 B2 | 10/2014 | Cordova |
| 9,037,125 B1 * | 5/2015 | Kadous ............. H04M 1/72577 455/418 |
| 9,037,199 B1 | 5/2015 | Stogaitis et al. |
| 2003/0098784 A1 | 5/2003 | Van Bosch et al. |
| 2006/0253249 A1 | 11/2006 | Bruelle-Drews |
| 2009/0085728 A1 | 4/2009 | Catten et al. |
| 2009/0327888 A1 | 12/2009 | Woolf et al. |
| 2010/0201505 A1 | 8/2010 | Honary |
| 2010/0280711 A1 | 11/2010 | Chen |
| 2011/0074565 A1 | 3/2011 | Cuddihy et al. |
| 2011/0084807 A1 | 4/2011 | Logan et al. |
| 2011/0148575 A1 | 6/2011 | Sobecki et al. |
| 2012/0053793 A1 | 3/2012 | Sala |
| 2013/0088352 A1 | 4/2013 | Amis |
| 2013/0109342 A1 | 5/2013 | Welch |
| 2013/0150004 A1 | 6/2013 | Rosen |
| 2013/0158771 A1 * | 6/2013 | Kaufmann ............ B60W 40/08 701/23 |
| 2014/0164559 A1 | 6/2014 | Demeniuk |

(Continued)

FOREIGN PATENT DOCUMENTS

| | | |
|---|---|---|
| KR | 101319939 B1 | 10/2013 |
| KR | 101335344 B1 | 12/2013 |
| WO | WO 2013188977 A2 | 12/2013 |

OTHER PUBLICATIONS

US 8,868,286, 10/2014, Mullen (withdrawn)

(Continued)

*Primary Examiner* — Redhwan K Mawari
*Assistant Examiner* — Anshul Sood
(74) *Attorney, Agent, or Firm* — Frank MacKenzie; Bejin Bieneman PLC

(57) ABSTRACT

Data representing movement of a portable device is received. A vibrational torque signal within that data corresponding to the vibration of a steering wheel is identified. Based at least in part on the identification, it is determined that a user has a hand on the steering wheel.

20 Claims, 5 Drawing Sheets

(56) References Cited

U.S. PATENT DOCUMENTS

| | | |
|---|---|---|
| 2014/0180731 A1 | 6/2014 | Cordova |
| 2014/0188348 A1 | 7/2014 | Gautama et al. |
| 2014/0297220 A1 | 10/2014 | Raffa |
| 2014/0309934 A1 | 10/2014 | Ricci |
| 2014/0310788 A1 | 10/2014 | Ricci |
| 2014/0333425 A1 | 11/2014 | Giraud |
| 2014/0335902 A1 | 11/2014 | Guba |
| 2015/0019266 A1 | 1/2015 | Stempora |
| 2015/0025917 A1 | 1/2015 | Stempora |
| 2015/0070131 A1 | 3/2015 | Beaurepaire et al. |
| 2015/0130640 A1 | 5/2015 | Ryu et al. |
| 2015/0256996 A1 | 9/2015 | Allen et al. |

OTHER PUBLICATIONS

V. Goglia et al., "Hand-transmitted vibration from the steering wheel to drivers of a small four-wheel drive tractor", Applied Ergonomics 34 (2003) 45-49.*

Non-Final Office Action dated Apr. 7, 2016; U.S. Appl. No. 14/713,019, filed May 15, 2015; 20 pages.

Non-Final Office Action dated Apr. 12, 2016; U.S. Appl. No. 14/713,045, filed May 15, 2015; 13 pages.

Non-Final Office Action dated Apr. 1, 2016; U.S. Appl. No. 14/712,994, filed May 15, 2015; 14 pages.

P. Koteswara Rao, "Scening of an accidental alarm system of vehicles with a Heart beat sensor," International Journal of Emerging Trends & Technology in Computer Science, vol. 2, Issue 2, Mar.-Apr. 2013, pp. 191-194.

\* cited by examiner

HAND-ON STEERING WHEEL DETECTION

CROSS-REFERENCE TO RELATED APPLICATIONS

This application is related to U.S. patent application Ser. No. 14/712,994, entitled "DETERMINING VEHICLE OCCUPANT LOCATION", U.S. patent application Ser. No. 14/713,008, entitled "WEARABLE DATA MANAGEMENT DURING INCIDENT", U.S. patent application Ser. No. 14/713,019, entitled "DETERMINING VEHICLE OCCUPANT LOCATION" and U.S. patent application Ser. No. 14/713,045, entitled "DETERMINING VEHICLE OCCUPANT LOCATION", all being filed on the same day as this application; the complete contents of each of which are hereby incorporated herein by reference in their entireties.

BACKGROUND

Present systems and methods for confirming an identity of a driver and/or location of a user in a vehicle when the vehicle is moving through the use of a wearable portable device suffer from various deficiencies. For example, detecting a turning motion of a steering wheel with a wearable device may not be effective if the steering motion is too slow. Further, associating the turning motion of the steering wheel to a centripetal acceleration of the vehicle as measured by the wearable device is only effective during turning events. Between such turning events, it is not possible to identify a wearable device within the vehicle that is being worn by the driver or even if that driver has a wearable-equipped hand on the steering wheel.

DESCRIPTION

Introduction

Figure 1:
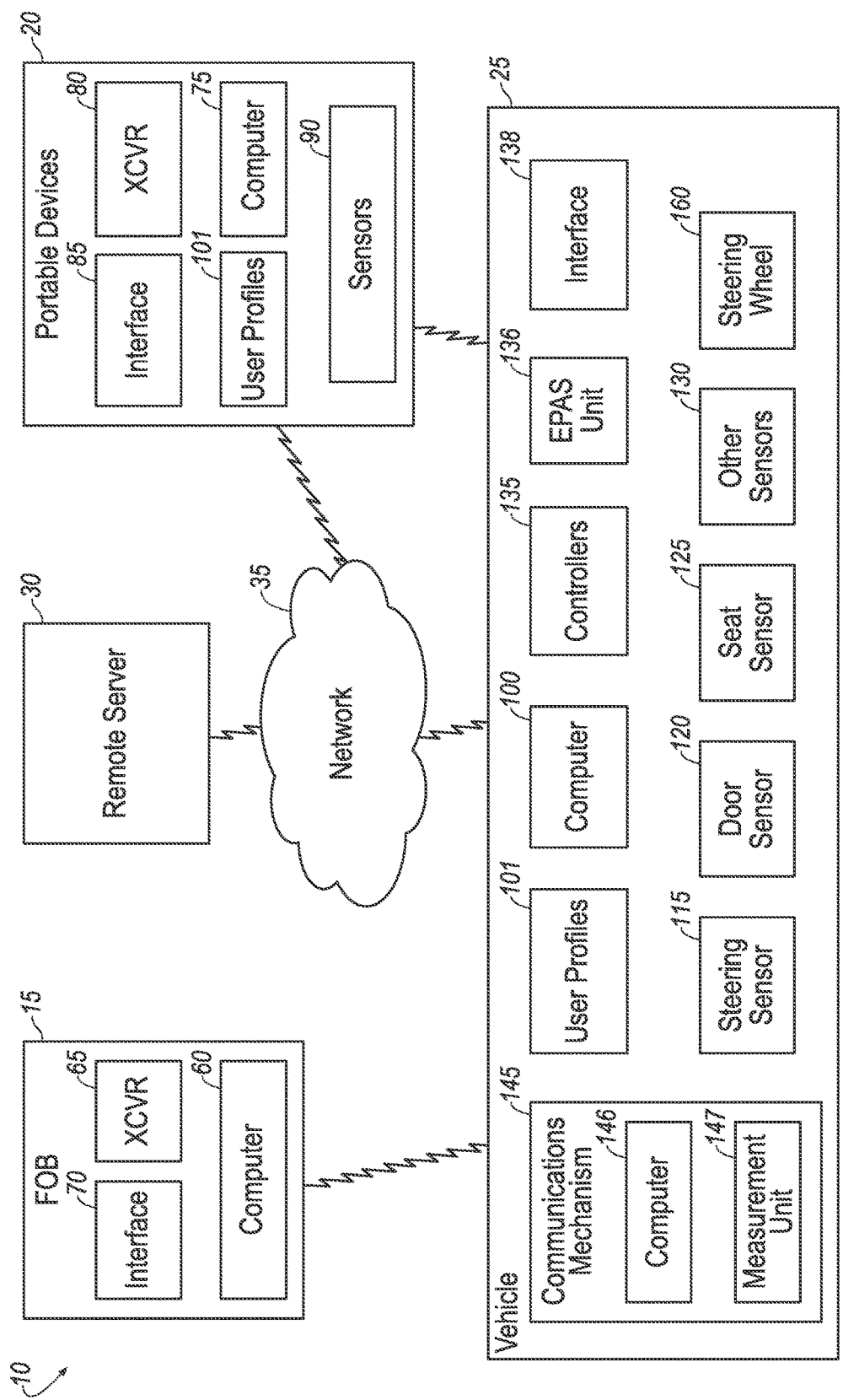
FIG. 1 is block diagram of an exemplary system for determining that a driver has a hand on a steering wheel using a wearable portable device.

Referring to FIG. 1, a vibrational torque from a road into a steering wheel 160 is measured by a portable device 20 worn on a person's wrist, hand, or arm holding a steering wheel 160 in a vehicle 25. The portable device 20 may send first movement data to a vehicle 25 computer 100 including a first vibrational torque signal reflecting the vibrational torque. The computer 100 may identify the first vibrational torque signal and determine that a user has at least one hand on the steering wheel 160.

Additionally, the vehicle 25 may include an electric power assisted steering unit (EPAS unit) 136. The EPAS unit 136 may measure the vibrational torque and provide a second movement data including a second vibrational torque signal to the computer 100. The computer 100, as part of the process for identifying the first vibrational torque signal, may compare the first movement data from the portable device 20 with the second movement data from the EPAS unit 136.

In addition to determining that the user has at least one hand on the steering wheel 160, the computer 100 may determine or confirm an identity of the user driving the vehicle 25. For example, the portable device 20 may send identification data to the computer 100. Based on the identification data, the computer 100 may associate the portable device 20 with a specific user. This association may be made, for example, with use of a user profile 101 that identifies the specific user as the user of the portable device 20. In this manner, the computer 100 can determine that the user is located in the driver's seat.

Upon determining that a user has a hand on the steering wheel 160, the computer 100 may adjust one or more parameters for controlling the vehicle 25 and may communicate with one or more vehicle 25 interfaces 138. The computer 100 may further store data in a memory, e.g., a time when the user was holding the steering wheel, such that the data is available for analysis, e.g., to analyze accidents, etc.

Additionally, determining a particular location of, e.g., a specific seat occupied by a user in a vehicle 25 can allow a vehicle 25 computer 100 to personalize the user experience, by, for example, adjusting seat position, adjusting mirror positions, etc. Safety systems such as seatbelt systems and airbag systems may be adjusted according to the respective locations of one or more users within the vehicle 25.

System Elements

Turning to FIG. 1 in more detail, a system 10 includes a remote keyless entry device 15 which may be a traditional fob or, e.g., a phone based remote entry telematics application (hereinafter fob 15), one or more portable devices 20, a vehicle 25, a server 30 and a network 35. As described below, the fob 15 and portable device 20 may be communicatively coupled with the vehicle 25. Further as described below, the portable device 20 may be, e.g., a wearable device with or without cellular capability, a mobile telephone, a tablet, etc., and may be directly communicatively coupled with the vehicle 25, or indirectly coupled with the vehicle 25, e.g., through another portable device 20. The vehicle 25 may further be communicatively coupled with the server 30 via the network 35.

The fob 15 is configured, i.e., includes known mechanisms such as programming in a computer 60 and hardware such as a transceiver 65 for wireless communications, to send messages to the vehicle 25, e.g., commands or instructions controlling operations of the vehicle 25. For example, the fob 15 may send commands to the vehicle 25 instructing the vehicle 25 to lock or unlock doors, open a trunk lid or other hatch, start the ignition, etc. The fob 15 further generally includes a user interface 70. The fob 15 may be an app on the portable device 20 which sends these same commands to the remote sever 30 or network 35 which may then send commands to the vehicle 25 instructing the vehicle 25 to lock or unlock doors, open a trunk lid or other hatch, start the ignition, etc.

One or more fobs 15 may be paired with a vehicle 25. For example, as is known, a fob 15 may be programmed with a specific identification code and the vehicle 25 may include a list of identification codes authorized to send commands to the vehicle 25. The vehicle 25 may look for one or more identification codes upon receiving messages, and determine if the fob 15 is authorized.

The fob 15 computer 60 includes a processor and a memory. The processor is programmed to execute programs stored in the memory, e.g., to send commands to the vehicle 25. The transceiver 65 is configured to transmit radio frequency (RF) signals to, and optionally receive RF signals from the vehicle 25. As is known, typical fob 15 frequencies of operation for one-way communication are 315 MHz or 433 MH and for two-way communications are 902 MHz or 868 MHz. For Passive Entry and Passive Start systems, the vehicle 25 may send commands to Fob 15 using Low Frequency (LF) transmissions at frequencies of 125 kHz or 135 kHz.

The fob 15 user interface 70 includes one or more input mechanisms and may include a display. The input mechanisms may be buttons, a touch screen display, a gesture sensing device, etc., for receiving input from a user. The display may include an LCD display, LED display, buzzers speakers, haptic feedback, etc., for providing information to the user.

Additionally or alternatively, other systems may also be used to command the vehicle 25 to unlock, start, etc. For example, the vehicle 25 may be equipped with a passive entry system, e.g., that sends a message to fobs 15 proximate to the vehicle 25 and looks for a response from a paired fob 15. Other possible systems to unlock/start/etc. the vehicle 25 include a keypad, remote entry mechanical key, telematics unlock system, etc.

A portable device 20 may be, e.g., a wearable portable device 20 or a mobile portable device 20. A wearable portable device 20 may include a connectivity product such as a "smart" watch, a fitness band, smart clothing, jewelry, etc. A mobile portable device 20 may include, e.g., a mobile telephone, tablet, laptop, etc. Some wearable portable devices 20 may include built-in modems or full cellular capability. Other wearable portable devices 20 may need to link or pair, e.g., with a mobile portable device 20 such as a mobile telephone, tablet, laptop, etc. in order to establish communications with the vehicle 25. Each portable device 20 typically includes a computer 75, a transceiver 80, and an interface 85. The portable device 20 may further include one or more sensors 90, discussed further below.

Each portable device 20 may be associated with a user. For example, the portable device 20 may include a user profile 101, and send the user profile 101 to the vehicle 25 when the portable device 20 initiates communication with the vehicle 25. Alternatively, the portable device 20 may have been paired with the vehicle 25, for example, via a synchronization system in the vehicle 25. In this case, the vehicle 25 may maintain a user profile 101 associated with the paired (synchronized) portable device 20.

The user profile 101 may be a set of data associated with the user. The user profile 101 may include data such as user preferred vehicle settings (e.g., seat settings, mirror settings, temperature settings, radio station), user characteristics (e.g., height, weight, age, medical conditions), routines (typically drives to work on weekday mornings), etc. The user profile 101 may be maintained by a computer 100 on the vehicle 25. Additionally or alternatively, one or more portable devices 20 may maintain a user profile 101 identified with the user. The user profiles 101 maintained on the portable devices 20 may be accessed by the vehicle 25 and combined with the data in the vehicle 25 user profile 101. The data in the user profile 101 may be entered by the user via an interface on the vehicle 25 or one of the portable devices 20 associated with the user, determined by the computer 100 in the vehicle 25, downloaded from other computing devices, e.g., the server 30, etc.

The portable device 20 may be configured for short range, wireless communication with the vehicle 25. For example, the portable device 20 transceiver 80 may be a BLUETOOTH® transceiver capable of forming links with other BLUETOOTH transceivers. One or more portable devices 20 and the vehicle 25 may accordingly exchange messages. A portable device 20 may transmit a signal including, e.g., identification data (identifying the type of user device, the identity of a user, etc.), movement data, etc. to the vehicle 25. In addition or alternatively to BLUETOOTH, other suitable wireless communication protocols, e.g., NFC, IEEE 802.11 or other protocols as may be known, may be used for communication between the portable devices 20 and the vehicle 25.

Further, a portable device 20 may be configured to link with other portable devices 20. For example, a first portable device 20 may be a smart watch, and a second portable device 20 may be a mobile telephone. The first portable device 20 may link with the second portable device 20 and exchange data with the second portable device 20; the first and second portable devices 20 may be associated with a same user. As one example, the first portable device 20 may include biometric sensors 90 to measure the heart rate of the user and transmit the heart rate to the second portable device 20. The second portable device 20 may output the heart rate data to the user via the second portable device 20 interface 85. BLUETOOTH communication links typically operate at frequencies from 2402-2480 MHz. As above, other suitable wireless communication protocols such as are known may alternatively or additionally be used to form the communication links with other portable devices 20.

In addition to biometric sensors 90, portable device 20 sensors 90 may include accelerometers, g-sensors, gyroscopes, compasses, light sensors, cameras, etc. The sensors 90 may measure movements of the portable device 20 and output movement data that the portable device 20 may then communicate to the vehicle 25. As described below, the vehicle 25 may determine, based on the movement data, e.g., that the user of the portable device 20 has opened a door of the vehicle 25.

Figure 2:
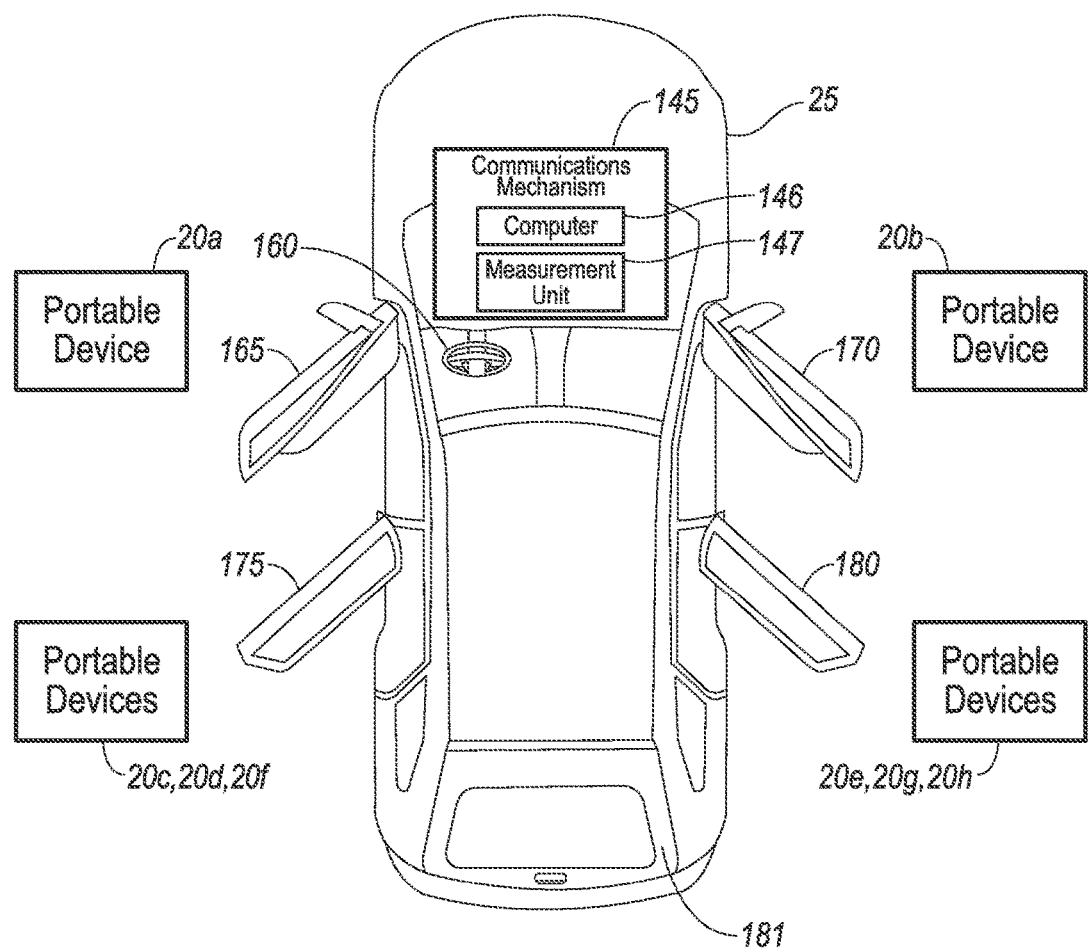
FIG. 2 is a top view of an exemplary vehicle including a communications mechanism for communicating with portable devices.

The vehicle 25 is generally a land-based vehicle having three or more wheels, e.g., a passenger car, light truck, etc. The vehicle 25 accordingly generally has a front, a rear, a left side and a right side, wherein the terms front, rear, left and right are understood from the perspective of a user of the vehicle 25 seated in a driver's seat in a standard operating position, i.e., facing a steering wheel 160 (FIG. 2). The vehicle 25 includes the computer 100 including a processor and a memory. The memory includes one or more forms of computer-readable media, and storing instructions executable by the processor for performing various operations, including as disclosed herein. Further, the computer 100 may include and/or be communicatively coupled to more than one other device, e.g., steering sensors 115, door sensors 120, seat sensors 125, other sensors 130 and controllers 135. The vehicle 125 computer 100 is further typically communicatively coupled with a communications mechanism 145 configured for wireless communications with on-board and external wireless devices including the fob 15, portable device 20, remote server 30 and network 35.

The computer 100 is generally programmed and arranged for communications on a controller area network (CAN) bus or the like. The computing device 100 may also have a connection to an onboard diagnostics connector (OBD-II), e.g., according to the J1962 standard. Via the CAN bus, OBD-II connector port, and/or other wired or wireless mechanisms, the computer 100 may transmit messages to various devices in a vehicle and/or receive messages from the various devices, e.g., controllers, actuators, sensors, etc. In addition, the computer 100 may be configured for communicating, e.g., with one or more remote servers 30, with one or more fobs 15, with one or more portable devices 20 and/or with the network 35.

The steering sensors 115 may be steering angle sensors, steering torque sensors, motor sensors associated with power steering assist, etc., known to provide data related directly or indirectly to steering operations. For example, a steering sensor 115 may be a steering angle sensor which senses a rotation of a vehicle 25 steering wheel 160, and communicates the steering wheel 160 rotation data to the computing device 100. As another example, a steering sensor 115 may sense rotation of a motor providing power assist for steering operations, and provide the motor rotation data to the computer 100.

Door sensors 120 may be mechanical switches that are activated by the door, proximity sensors, hall-effect sensors, or the like, such as are known, that indicate if a door is open or closed and that provide door status data to the computing device 100. For example, there may be one door sensor 120 associated with each door of the vehicle 25.

Seat sensors 125 may include a variety of sensors including occupancy sensors and seat position sensors such as are known. The seat sensors 125 may, e.g., determine whether a user is occupying a seat, determine the weight of the user, and communicate the determined weight to the computer 100. Further, the seat sensors 125 may detect either directly or indirectly the position of a seat, angle of a seat back, height of a headrest, etc., and provide data to the computer 100 with regard to one or more of these settings. Yet further, the computer 100, may, e.g., upon identifying a seat user, adjust settings to a user profile associated with the user.

The vehicle 25 may include one or more other sensors 130. The other sensors 130, may include, as non-limiting example only, cameras, optical sensors, radar, microphones, proximity sensors, ultrasonic sensors, pressure sensors, accelerometers, gyroscopes, temperatures sensors, current sensors, voltage sensors, infrared sensors, capacitive sensors, etc. The sensors may include processors and memories, and may be configured to communicate with and send data to the computer 100, e.g., via a CAN bus or the like.

The vehicle 25 may also include one or more controllers 135 for controlling vehicle 25 components. The one or more controllers 135 may include known controllers, as non-limiting examples, a seat controller, a power steering controller, a door lock controller, a door latch controller, a climate controller, a mirror adjustment controller, a seatbelt controller, a brake controller, etc. Each of the controllers 135 may include respective processors and memories, one or more actuators, and one or more sensors, as is known. The controllers 135 may be configured to receive instructions from the computing device 100 and control an actuator based on such instructions. For example, a door lock controller 135 may receive an instruction to unlock a door and may cause an actuator to unlock a lock associated with the door. Further, the controller 135 may include sensors. The sensors, may, e.g., detect the action of the actuator. For example, the door lock controller 135 may detect the lock being in an unlocked condition. The controller 135 may provide data regarding the status of the lock to the computer 100.

Specifically, the vehicle 25 may include an electric power assisted steering unit (EPAS unit) 136. The EPAS unit 136 may measure the steering torque feedback of a road into the steering wheel 160 (FIG. 2) of the vehicle 25. The EPAS unit 136 may be configured to receive instructions from the computer 100, and further be configured to send, e.g., to the computer 100, data representing the torque feedback of the road during travel.

As stated above, a vehicle 25 may further include a communications mechanism 145 for wireless communications with vehicle on-board and external devices configured for wireless communications. For example, the communications mechanism 145 may include a computer 146 having a processor and a memory, and a measurement unit 147. The communications may be direct communications, i.e., between a transceiver in the communications mechanism 145 and a transceiver in the wireless device, or indirect communications, e.g., via a network such as a network 35.

The communications block 145 may generally be configured to support communications with 1-Way (typically 315 MHz or 433 MHz), or 2-Way (typically 902 MHz or 868 MHz) remote keyless entry (RKE) systems, passive-entry passive-start (PEPS) systems (125 kHz LF challenge and 315 MHz or 433 MHz response), near field communications (NFC) (typically 13.56 MHz), Bluetooth systems (2402-2408 MHz), vehicle-to-vehicle (V2V) systems and vehicle-to-infrastructure (V2I) systems in the Dedicated Short Range Communications (DSRC) Band (5.9 GHz), mobile devices in the cellular bands, Wi-Fi (typically 2.4 GHz or 5 GHz bands), GPS systems (1575.42 MHz and 1227.6 MHz), etc. Examples of protocols that the communication block 145 may support include Bluetooth, NFC, DSRC, 3G UMTS protocols as defined by the 3GPP standards body, 4G LTE protocols as defined by the 3GPP standards body, Wi-Fi 802.11 protocols as defined by IEEE, W-Max 802.16 protocols as defined by IEEE, or other suitable wireless communication protocols.

As described in more detail below, the communications mechanism 145 may be configured to communicate with the fob 15, the portable device 20 and, via the network 35, with a remote server 30.

The communications mechanism 145 may be configured to establish communications with one or more portable devices 20. Upon receiving an instruction to unlock the vehicle 25 as described above, the computer 100 may instruct the communications mechanism 145 to search for and establish communications with portable devices 20 proximate to, e.g., within 3 meters of, the vehicle 25. The communications mechanism 145 may search for all portable devices 20 proximate to the vehicle, or, e.g., a specific list of portable devices 20 associated with known users of the vehicle 25. The portable devices 20 may then respond to the communications mechanism 145. In another scenario, the communications mechanism 145 may, e.g., periodically search for, and establish communications with, portable devices 20 proximate the vehicle 25. Upon establishing communications with the devices 20, the communications block 145 may send instructions requesting user identification data, movement data, etc. from the portable devices 20. In certain scenarios, the computer 100 may specifically establish communications directly or indirectly with wearable portable devices 20.

In addition to communicating with the one or more portable devices 20, the communications mechanism 145 may determine a strength of signals received from respective portable devices 20. As shown in FIG. 1, the communications mechanism 145 may include a measurement unit 147. The measurement unit 147 may receive signals from the portable devices 20, and measure signal strength in a known manner. When applicable, e.g., when seeking to determine a location of a user, the measurement unit 147 should measure the signal strength of the signal transmitted from the wearable portable device 20 and not the signal transmitted from the supporting mobile portable device 20. The measurement unit 147 may provide this information to the computer 100. As described below, the strength of a signal received from a portable device 20 may be an indication of the distance (also referred to herein as range) of the portable device 20 from the communications mechanism 145. This information may be used, particularly in the case of a wearable portable device 20, to determine a boundary or zone where a user of the wearable portable device 20, is located within the vehicle 25. The measurement unit 147 may determine these zones with one transceiver antenna. Alternatively, two or more antennas may be used if, e.g., they exist for other features.

The vehicle 25 communications mechanism 145 may further be configured to communicate, e.g., over a network 35 with a remote server 30. For example, when the vehicle 25 has been involved in an accident, the vehicle 25 may be able to transmit a message to the remote server 30 indicating that the vehicle 25 was involved in an accident, and may be able to send additional information such as the location of the vehicle 25. When the vehicle 25 is linked to one or more portable devices 20, the vehicle 25, via the communications mechanism 145 may additionally or alternatively be able to send user status information, such as the user's vital signs, to the remote server 30.

The network 35 represents one or more mechanisms by which the vehicle 25 may communicate with remote computing devices, and may be one or more of various wired or wireless communication mechanisms, including any desired combination of wired (e.g., cable and fiber) and/or wireless (e.g., cellular, wireless, satellite, microwave and radio frequency) communication mechanisms and any desired network topology (or topologies when multiple communication mechanisms are utilized). Exemplary communication networks include wireless communication networks, local area networks (LAN) and/or wide area networks (WAN), including the Internet, providing data communication services.

Processes

Identifying a Vehicle Unlock or other Trigger Event for a User Location Identification Process The vehicle 25 computer 100 may receive a signal from the fob 15 to unlock the vehicle 25, or recognize another trigger event for starting a user location identification process. For example, a user of the vehicle 25 may activate the fob 15, and the fob 15 may send an unlock command to the vehicle 25. The vehicle 25 computer 100 may receive the unlock signal, and initiate a process to identify locations of one or more users in the vehicle 25.

As another example, a sensor 130 may detect a user grabbing or touching a door handle to pull on the door handle with the intent to open the door, and based on the detection, the computer 100 may initiate and establish communications with fobs 15 proximate the vehicle 25 to authorize unlocking a door. The computer 100 may determine that one or more of the fobs 15 is an authorized fob 15 for the vehicle 25, e.g., in a manner as described above. Conversely, if the door was already unlocked the trigger of sensor 130 may still be used to inform computer 100 that a user is about to open a door. The computer 100 may also receive an input from a key pad on the vehicle 25, a door or global unlock event activated by a mechanical key, an ignition activated by a mechanical key, from a telematics system, etc. that is identified as a trigger event for initiating a user location identification process. Still further, the computer 100 could initiate the user location identification process periodically, based on a timer, etc.

Associating Portable devices with Users

The computer 100 is generally programmed to initiate a process to communicate with one or more portable devices 20 proximate to the vehicle 25. For example, the computer 100 may be triggered to initiate communications as described above. The computer 100 may send commands to portable devices 20 that were previously paired with the vehicle 25 requesting that the portable devices 20 respond and provide identification. The computer 100 may further listen for other, not previously paired portable devices 20 that are proximate to the vehicle 25. Further, the computer 100 may listen for messages between portable devices 20. Based on data collected from the messages, e.g., each portable device 20 may transmit an identifier or the like, the computer 100 may identify a portable device 20 or a group of portable devices 20 associated with a user, and may further associate the user and group of portable devices 20 with a user profile 101, e.g., maintained by the computer 100. The computer 100 then can wait for a predetermined time period, e.g., 10 seconds, following the transmission of the commands to the portable devices 20, and proceed to identify one or more groups of portable devices 20, and to associate the portable devices 20 and/or groups of portable devices 20 with users.

Identifying Door Opening Events from Wearable Device Movements Identifying Door Opening Events from Wearable Device Movements Upon recognizing a trigger event, the computer 100 may initiate a process to instruct the portable device 20, which may be a wearable portable device 20, to record g-sensor data for a specified period to hand motions and then monitor all vehicle 25 door sensors 120 to determine where users entered the vehicle 25. The computer 100 may monitor g-sensor movements of the portable devices 20 associated with vehicle 25 users, and based on the movement data identify a device 20, and hence a user, that may be associated with opening a particular vehicle 25 door. In the case of only one door opening and only one portable device 20 being identified with a signature movement data pattern, it may be possible to conclude who has entered that door. In cases where more doors have opened than there are detected portable devices 20, additional data is required to predict the user's location. The computer 100 may further use the movement data as an indication of where the user is located in the vehicle 25 after entering the vehicle 25.

Now referring to FIG. 2, the vehicle 25 may include a steering wheel 160, front left door 165, front right door 170, rear left door 175, rear right door 180, and rear door 181. The vehicle 25 may further include the communications mechanism 145. The communications mechanism 145 may be located in a front center portion of the vehicle 25. Alternatively, for example, a portion of the communication mechanism 145 used to establish communication with the portable devices 20 may be located in the center front portion of the vehicle 25, and other portions of the communications mechanism 145 may be located in one or more other locations in the vehicle 25. The portion of the communications mechanism 145 used to establish communications with the portable devices 20 should be strategically placed such that the strength of a signal received from a respective portable device 20 is indicative of a definable zone within the vehicle 25.

As described above, the communications mechanism 145 may include a measurement unit 147, and may be configured to establish communications with portable devices 20. The measurement unit 147 may be configured to measure the strength of signals received from the portable devices 20, and to report the strength of the signals from the respective portable devices 20 to the computer 100 of the vehicle 25.

Upon identifying a trigger event for initiating a user location identification process as described above, the computer 100, based on the trigger event may activate the communications mechanism 145, and instruct the communications mechanism 145 to search for and establish communications with portable devices 20 proximate the vehicle 25. The computer 100 may limit the search to previously paired portable devices 20. As above, when applicable, e.g., when seeking to identify a range of a user from the communications mechanism 145, the measurement unit 147 should measure the signal strength of the signal transmitted from the wearable portable device 20 and not the signal transmitted from the supporting mobile portable device 20.

As shown in FIG. 2, in one example, the computer 100 may find and establish communications (via the communications mechanism 145) with portable devices 20a-20h which are determined to be wearable portable devices 20. The computer 100 may command each of the wearable portable devices 20a-20h to send movement data associated with the respective wearable portable devices 20a-20h to the computer 100.

By monitoring and evaluating the movement data received from the wearable portable devices 20a-20h, the computer 100 may determine, e.g., that the user of wearable portable device 20a has opened a left side door 165, 175. Particular wrist movements, e.g., one or more of twisting counter-clockwise to grab a door handle, swinging up and to the left to open a door handle, swinging to the left on an arc similar to the arc of a door handle on a left handed door being opened, may be indicative of opening a left side door 165, 175 of the vehicle 25.

In a similar manner, the computing device 100 may determine, e.g., that a user of wearable portable device 20d also opened a left side door 165, 175, and further, in a similar manner, by identifying gestures associated with a right side door, that e.g., the user of wearable portable device 20e has opened a right side door 170, 180.

In addition to identifying movements of a wearable portable device 20 worn by a user on an arm used for opening a door, other types of movements may be identified as movements indicating a door opening. For example, for a user opening a right door 170, 180 with their right arm, and wearing a wearable portable device 20 on their left arm, particular movements, for example the swinging of the left arm around the body during door opening (or entering the vehicle 25) may be indicative of a right door 170, 180 opening event. Other movements of wearable devices 20 may be determined to be characteristic of opening a vehicle 25 door, 165, 170, 175, 180, 181. Further, movements that are characteristic of closing a vehicle 25 door 165, 170, 175, 180, 181 may indicate a user having entered a left door 165, 175, right door 170, 180 or rear door 181.

As described above, a determination that a user has opened a particular vehicle 25 door 165, 170, 175, 180, 181 may be performed by the computer 100. Additionally or alternatively, the determination may be made, e.g., by the computer 75 in the respective wearable portable device 20, and the results communicated to the computer 100. Additionally or alternatively, the determination may be made by another computer communicatively coupled to the computer 100.

Identifying Location Zones for Wearable Portable Devices based on Received Signal Strength Additional information regarding the location of users within a vehicle 25 may be determined based on the received signal strength of signals received by the communications mechanism 145 from portable devices 20. When applicable, e.g., when seeking to determine a range of a user from the communications mechanism 145, the portable devices 20 may be wearable portable devices 20.

Figure 3:
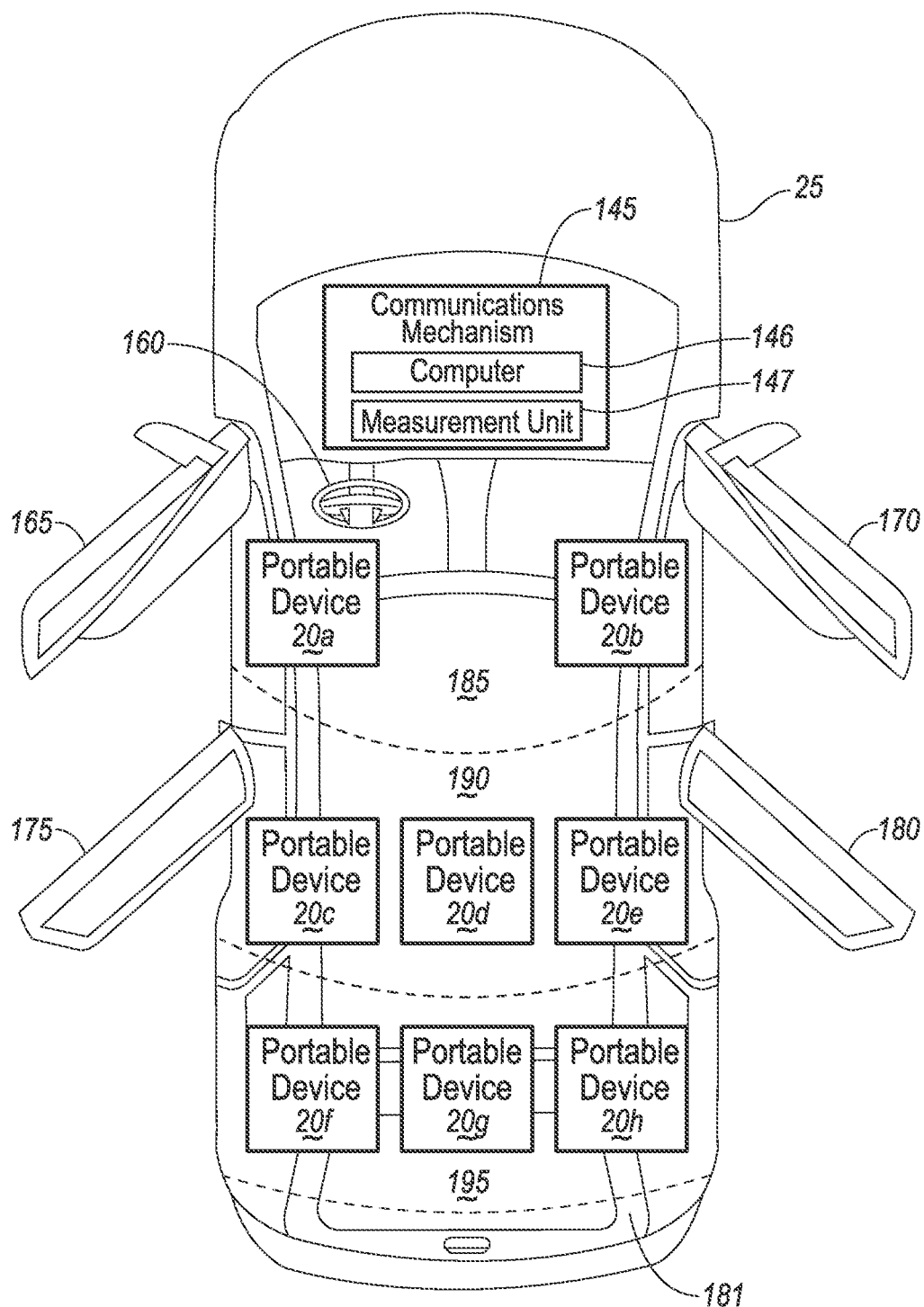
FIG. 3 is a further top view of the exemplary vehicle of FIG. 2, including the communications mechanism, illustrating location zones.

As shown in FIG. 3, the vehicle 25 may be divided into three or more zones based on distance from the communications mechanism 145; a first zone 185, a second zone 190 and a third zone 195. The portable devices 20a and 20b may be located in the first zone 185. The portable devices 20c, 20d, 20e may be located in the second zone 190, and the portable devices 20f, 20g, 20h may be located in the third zone 195. As above, the computing device 100 may establish communications via the communications mechanism 145 with each of the portable devices 20a-20h.

The communications mechanism 145 may be configured to measure received signal strength of the signals received from each of the portable devices 20a-20h, and provide a received signal strength indication (RSSI) such as is known to the computer 100 respectively for each of the portable devices 20a-20h.

Based on the respective received signal strengths, the computer 100 may determine the zone in which each of the portable devices 20a-20h is located. For example, if the RSSI is greater than or equal to a first predetermined threshold and less than a second predetermined threshold, the computing device may determine that the associated portable device 20 is located within the third zone 195. If the RSSI is greater than or equal to the second predetermined threshold and less than a third predetermined threshold, the computer 100 may determine that associated portable device 20 is located in the second zone 190. If the RSSI is greater than or equal to the third predetermined threshold, the computer 100 may determine that the associated portable device 20 is located in the first zone 185. The first, second and third predetermined thresholds may be determined empirically based on representative portable devices 20, the location of the communications mechanism 145, the type of vehicle 25, etc. In the example according to FIG. 3, the computer 100 would determine that portable device 20a-20b are in the first zone 185, devices 20c-20e are in the second zone 190 and devices 20f-20h are in the third zone 195.

Identifying the Driver and Front Seat Passenger based on Door Opening and Zone Data Based on the door opening data and zone data collected above, the computer 100 can be programmed to determine the driver and front passenger of the vehicle 25.

For example, if, as described above, the computer 100 determines based on the RSSI of the portable device 20a that the portable device 20a is in the first zone 185, and determines based on the movement data from the portable device 20a that the user of portable device 20a entered a left side door of the vehicle 25, the computer 100 may further determine that the user of the portable device 20a is located in a front left (driver's) seat of the vehicle 25.

Further, if, in the example above, the computer 100 determines based on the RSSI of portable device 20b that the portable device 20b is also in the first zone 185, the computer 100 may determine that the user of the portable device 20b is in a front passenger seat. The same process for locating the driver and front row passenger can also be applied to right hand drive vehicles by reversing the relationships of detected door opening events.

Figure 4:
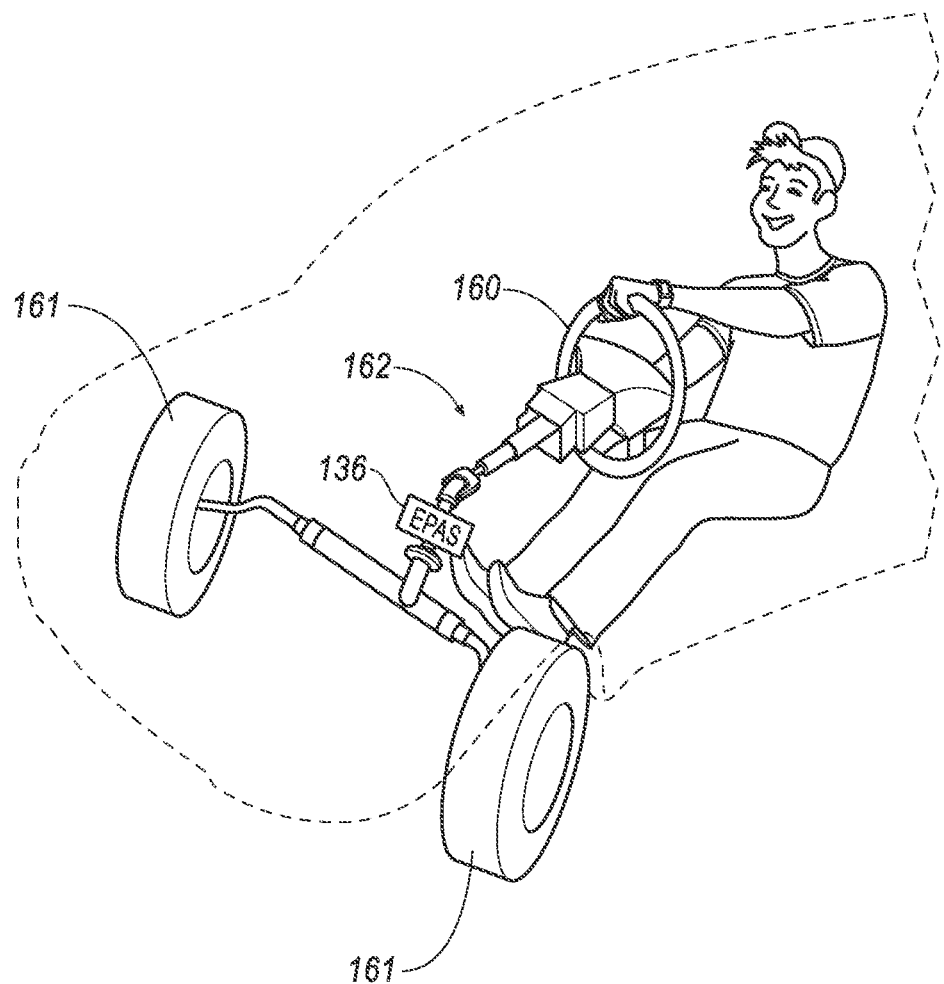
FIG. 4 is a perspective view of an exemplary vehicle including a steering column.

Determining that a User has at least One Hand on the Steering Wheel based on a Vibrational Torque Signal Referring to FIG. 4, when a vehicle 25 is moving, the steering wheel 160 experiences steering torque feedback generated by the interaction between vehicle 25 front wheels 161 and a road on which the vehicle 25 is travelling. The higher frequency components of the torque that is transmitted, via a steering column 162, from the wheels 161 to the steering wheel 160 can be considered vibrational torque. The vibrational torque may, e.g., be a periodic vibration at a particular frequency greater than 5 Hz. The frequency may reflect a natural resonant frequency of the steering system. Additionally or alternatively, the frequency may vary, e.g., with the speed of the vehicle, with the condition of the road, the condition of the tires, weather conditions, etc.

A wearable portable device 20, on an arm, hand, or wrist of a user holding the steering wheel 160, experiences acceleration due to the vibrational torque. Sensors 90 (FIG. 1), e.g., g-sensors 90, included in the portable device 20 may detect movement of the portable device 20, including the vibrational torque. Based on the movement, the portable device 20 may send mobile movement data to the computer 100. The mobile movement data may include a vibrational torque signal representing the acceleration experienced by the portable device 20 due to the vibrational torque, and may include one or more periodic signals or signal components.

The vehicle 25 may further include, e.g., an electric power assist unit (EPAS unit) 136. The EPAS unit 136, may measure the vibrational torque transmitted from the wheels 161 to the steering wheel 160. The electric power assist unit 136 may further, based on the measurements, transmit vehicle movement data to the computer 100. The vehicle movement data may include a vibrational torque signal representing the vibrational torque.

Upon receiving the mobile movement data and vehicle movement data, the computer 100 may analyze the vehicle movement data, and identify the vibrational torque signal. For example, the computer 100 may identify one or more power peaks in the vehicle movement data at a frequency characteristic of the vibrational torque. A power peak could be, for example, a power level of a particular frequency component that is 3 dB (decibels) higher than the power level of neighboring frequency components. A frequency characteristic of the vibrational torque could be a frequency within a predetermined range of frequencies. The predetermined range of frequencies could be determined, e.g., empirically. Additionally or alternatively, the predetermined range of frequencies could depend, for example, on a speed of the vehicle 25.

After identifying the vibrational torque signal in the vehicle movement data, the computer 100 may then analyze the mobile movement data, and may determine if there is a matching power peak in the mobile movement data. The matching power peak could be, e.g., a power level that is a predetermined amount higher than the power level of neighboring frequency components, at a frequency that corresponds to the power peak in the vehicle movement data.

In some cases, the computer 100 may determine the presence of a vibrational torque signal in the mobile movement data without the use of vehicle movement data. The computer 100 may analyze the mobile movement data, and, e.g., determine if it contains periodic signals at frequencies and/or power levels characteristic of a vibrational torque signal, as described above with regard to the vehicle movement data.

If the computer 100 determines that the mobile movement data includes the vibrational torque signal, the computer may further determine that a hand of a user associated with the portable device 20 is on the steering wheel 160. Still further, the computer 100 may determine that the user is located in the vehicle 25 driver's seat.

Figure 5:
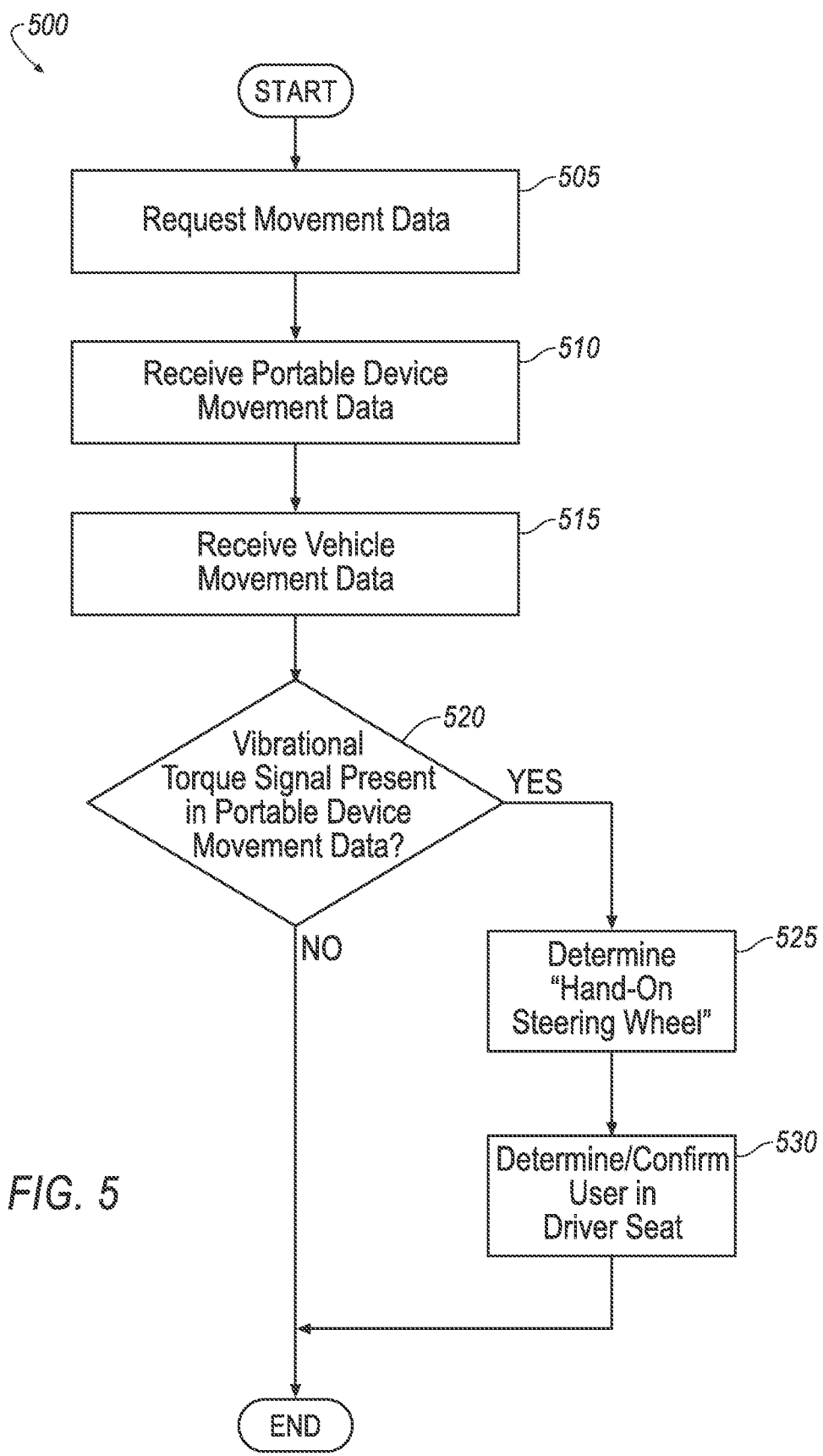
FIG. 5 is a diagram of an exemplary process for determining that a hand of a user is on a steering wheel.

Process for Determining a Hand-on Steering Wheel based on Identifying a Vibrational Torque Signal FIG. 5 is a diagram of an exemplary process 500 for determining that a user has at least one hand on the steering wheel 160. The process 500 begins in a block 505.

In the block 505, the computer 100 sends requests for movement data from the portable device 20 and from the vehicle 25. The computer 100 may, e.g., initiate these requests based on a trigger event. The trigger event could be, e.g., that the vehicle 25 has started to move, or the vehicle 25 has achieved a predetermined speed, e.g., 30 mph. The trigger event could alternatively or additionally be that a certain amount of time, e.g., 10 seconds, has passed since the last time that the computer 100 executed the process 500. Upon identifying the trigger event, the computer 100 may, send, e.g., a first request to the portable device 20 via the communications mechanism 145 for mobile movement data, and, in some cases, e.g., when the vehicle 25 includes an electric power assisted steering unit 136, send a second request to an electric power assist unit 136 via a vehicle 25 CAN bus, for vehicle movement data. The process 500 continues in a block 510.

In the block 510, the computer 100 receives mobile movement data from the portable device 20 representing movement of the portable device 20. The mobile movement data from the portable device may be generated based on input received from sensors 90 included in the portable device 20. In the case that a user is holding the steering wheel 160, the mobile movement data may include a first vibrational torque signal representing a vibrational torque transmitted from the wheels 161 of the vehicle 25 to the steering wheel 160 via the steering column 162. The process continues in a block 515.

In the block 515, the computer 100 may, in some cases, further receive vehicle movement data from the vehicle 25. A vibrational torque signal may extracted from the vehicle movement data and used as a reference for identifying a vibrational torque signal in the mobile movement data. As described above, the vehicle movement data may be generated by an electric power steering assist unit EPAS unit 136, and may also include a second vibrational torque signal representing a vibrational torque transmitted from the wheels 161 to the steering wheel 160 via the steering column 162. The EPAS unit 136 may, for example, measure the vibrational torque experienced by the steering column 162, and may therefrom generate vehicle movement data including the second vibrational torque signal based on these measurements. The EPAS unit 136 may send, and the computer 100 may receive, the vehicle movement data.

In other cases, the block 515 may be omitted. The computer 100 may, also as described above, determine the presence of a vibrational torque signal in the mobile movement data based on characteristics of periodic signals recognized in the mobile movement data. The process continues in a block 520.

In the block 520, the computer 100 determines if the first vibrational torque signal is present in the movement data received from the portable device 20. As described above, in order to establish a reference for a vibrational torque signal, the computer 100 may first identify and characterize the second vibrational torque signal in the vehicle movement data received in block 515. The computer 100 may identify, e.g., one or more power peaks in the vehicle movement data at a one or more frequencies characteristic of the vibrational torque. Additionally or alternatively, a frequency of periodic signal identified in the vehicle movement data could be determined to be within a predetermined range of frequencies characteristic of a vibrational torque signal. The range of frequencies may be a fixed, predetermined range, or variable, depending, e.g., on the speed of the vehicle 25.

The computer 100 may then analyze the movement data received from the portable device 20 and determine if a vibrational torque signal is present. In the case of having extracted a vibrational torque signal from vehicle movement data as described above, the computer 100 may determine whether a similar vibrational torque signal may be identified in the mobile data. In the case that vehicle movement data has not been received, the computer 100 may determine, based on characteristics of signals identified in the mobile movement data, whether a vibrational torque signal is present. If the computer 100 determines that the vibrational torque signal is not present in the mobile movement data, the process 500 ends. If the computer 100 determines that the vibrational torque signal is present, the process 500 continues in a block 525.

In the block 525, the computer 100 determines that the user has a hand on the steering wheel 160. The computer 100 may, e.g., store the information. The computer 100 may further display the information on a vehicle interface 138, and/or use the information to adjust one or more parameters for controlling the vehicle 25. The process continues in a block 530.

In the block 530, the computer 100 may further determine that the user of the portable device 20 is located in the driver's seat. Based on the determination that the user is in the driver's seat, the computer 100 may, additionally or alternatively, adjust one or more parameters for controlling vehicle components. The process 500 then ends.

Conclusion

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer comprising a memory and a processor storing instructions executable by the processor such that the computer is programmed to:
   receive from a wearable portable device, mobile movement data representing movement of the wearable portable device;
   identify, from the mobile movement data, a vibrational torque signal including a periodic component, the periodic component corresponding to a vibration of a steering wheel during driving and transmitted by the steering column to the steering wheel; and
   determine that a hand of a user is on the steering wheel based at least in part on the periodic component of the vibrational torque signal from the mobile movement data.

2. The computer of claim 1, wherein the computer is further programmed to determine that the periodic component is in a predetermined frequency range in the identification of the vibrational torque signal including the periodic component from the mobile movement data.

3. The computer of claim 1, further programmed to:
   receive vehicle movement data from a vehicle component, the vehicle movement data including a vibrational torque signal corresponding to the vibration of the steering wheel; and
   include a comparison of the vehicle movement data with the mobile movement data in the identification of the vibrational torque signal.

4. The computer of claim 3, wherein the comparison includes a correspondence between at least one of a frequency and an amplitude of the periodic component of the vibrational torque signal identified in the mobile movement data and at least one of a frequency and an amplitude of a periodic signal identified in the vehicle movement data.

5. The computer of claim 1, further programmed to:
associate the wearable portable device with the user; and
determine, based at least in part on the periodic component of the vibrational torque signal, that the user is located in a driver's seat.

6. The computer of claim 5, further programmed to:
adjust at least one parameter of one vehicle component based on the determination that the user is located in the driver's seat.

7. The computer of claim 1, wherein the periodic component of the vibrational torque signal includes a frequency greater than 5 Hertz.

8. The computer of claim 1, further programmed to:
send, to the wearable portable device, a request for the mobile movement data.

9. The computer of claim 8, further programmed to:
determine that a vehicle speed is greater than a predetermined threshold; and
send the request based at least in part on the determination that the vehicle speed is greater than the predetermined threshold.

10. The computer of claim 8, further programmed to:
send, to a vehicle component, a request for vehicle movement data.

11. A method comprising:
receiving, by a computer, from a wearable portable device, mobile movement data representing the movement of the wearable portable device;
identifying, from the mobile movement data, a vibrational torque signal including a periodic component, the periodic component corresponding to a vibration of a steering wheel during driving and transmitted by the steering column to the steering wheel; and
determining that a hand of a user is on the steering wheel based at least in part on the periodic component of the vibrational torque signal from the mobile movement data.

12. The method of claim 11, wherein identifying the vibrational torque signal in the mobile movement data includes determining that the periodic component of the vibrational torque signal is in a predetermined frequency range.

13. The method of claim 11, further comprising:
receiving vehicle movement data from a vehicle component, the vehicle movement data including a vibrational torque signal corresponding to the vibration of the steering wheel; and
comparing the vehicle movement data and the mobile movement data; wherein identifying the vibrational torque signal from the mobile movement data is based, at least in part, on the comparison.

14. The method of claim 13, wherein the comparison includes identifying a correspondence between at least one of a frequency and an amplitude of the periodic component of the vibrational torque signal identified in the mobile movement data with at least one of a frequency and an amplitude of a periodic signal found in the vehicle movement data.

15. The method of claim 11, further comprising:
associating the wearable portable device with the user; and
determining, based at least in part on the periodic component of the vibrational torque signal, that the user is located in a driver's seat.

16. The method of claim 15, further comprising:
adjusting at least one parameter of one vehicle component based on the determination that the user is located in the driver's seat.

17. The method of claim 11, wherein the periodic component of the vibrational torque signal includes a frequency greater than 5 Hertz.

18. The method of claim 11, further comprising:
sending, to the wearable portable device, a request for the mobile movement data.

19. The method of claim 18, further comprising:
determining that a vehicle speed is greater than a predetermined threshold; and
sending the request based at least in part on the determination that the vehicle speed is greater than the predetermined threshold.

20. The method of claim 18, further comprising:
sending, to a vehicle component, a request for vehicle movement data.

* * * * *